(12) United States Patent
Nair et al.

(10) Patent No.: US 11,845,010 B2
(45) Date of Patent: *Dec. 19, 2023

(54) GAMING CONTENT RECOMMENDATION BASED ON GAMING PERFORMANCE

(71) Applicant: Rovi Guides, Inc., San Jose, CA (US)

(72) Inventors: Govind Raveendranathan Nair, Karnataka (IN); Sangeeta Parida, Delhi (IN); Rajendran Pichaimurthy, Bangalore (IN); Amrit Srivastava, Bangalore (IN); Prakash Viswanathan, Karnataka (IN)

(73) Assignee: Rovi Guides, Inc., San Jose, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/537,016

(22) Filed: Nov. 29, 2021

(65) Prior Publication Data

US 2022/0161143 A1    May 26, 2022

Related U.S. Application Data

(63) Continuation of application No. 16/718,885, filed on Dec. 18, 2019, now Pat. No. 11,213,756.

(51) Int. Cl.
*A63F 13/798* (2014.01)
*A63F 13/86* (2014.01)
(Continued)

(52) U.S. Cl.
CPC ............ *A63F 13/798* (2014.09); *A63F 13/86* (2014.09); *A63F 13/87* (2014.09); *H04N 21/8549* (2013.01)

(58) Field of Classification Search
CPC ........ A63F 13/798; A63F 13/86; A63F 13/87; H04N 21/8549
See application file for complete search history.

(56) References Cited

U.S. PATENT DOCUMENTS 10,427,047 B2 * 10/2019 Benedetto ............. A63F 13/215
10,741,215 B1 *  8/2020 Sundareson ............ A63F 13/23
(Continued)

FOREIGN PATENT DOCUMENTS

| WO | 2010030313 | 3/2010 |
| WO | 2013002975 | 1/2013 |
| WO | 2017030844 | 2/2017 |

OTHER PUBLICATIONS

PCT International Search Report and Written Opinion for International Application No. PCT/US2020/065729, dated May 3, 2021 (20 pages).

*Primary Examiner* — Chase E Leichliter

(74) *Attorney, Agent, or Firm* — HALEY GUILIANO LLP

(57) ABSTRACT

Systems and methods for recommending video game content based on video game performance are disclosed. A level is identified from among a sequence of playable levels of a currently active video game. A video game performance metric for the identified level is determined. Based on the determined video game performance metric, a video of a performance of the identified level of the video game is selected for recommendation from among a plurality of videos stored in a database in association with corresponding video game performance metrics. An option, which is selectable to cause playback of the selected video, is transmitted for display via a computing device.

18 Claims, 8 Drawing Sheets

(51) Int. Cl.
   *A63F 13/87*      (2014.01)
   *H04N 21/8549*    (2011.01)

(56) References Cited

U.S. PATENT DOCUMENTS

| | | | |
|---|---|---|---|
| 10,791,370 B1* | 9/2020 | Viswanathan | A63F 13/5375 |
| 11,213,756 B2* | 1/2022 | Nair | A63F 13/86 |
| 2005/0246638 A1* | 11/2005 | Whitten | A63F 13/45 |
| | | | 715/708 |
| 2009/0131177 A1* | 5/2009 | Pearce | A63F 13/30 |
| | | | 463/43 |
| 2009/0208181 A1* | 8/2009 | Cottrell | A63F 13/86 |
| | | | 386/278 |
| 2011/0151971 A1* | 6/2011 | Altshuler | A63F 13/87 |
| | | | 463/30 |
| 2012/0172098 A1* | 7/2012 | Baker | G07F 17/3237 |
| | | | 463/43 |
| 2013/0084985 A1* | 4/2013 | Green | A63F 9/24 |
| | | | 463/40 |
| 2014/0128166 A1* | 5/2014 | Tam | A63F 13/216 |
| | | | 463/42 |
| 2015/0105154 A1* | 4/2015 | Green | A63F 13/63 |
| | | | 463/31 |
| 2015/0217196 A1* | 8/2015 | McCarthy | A63F 13/86 |
| | | | 463/24 |
| 2016/0199742 A1* | 7/2016 | McCarthy | H04N 21/8549 |
| | | | 463/31 |
| 2017/0087460 A1* | 3/2017 | Perry | A63F 13/497 |
| 2017/0228600 A1* | 8/2017 | Syed | G06V 20/62 |
| 2017/0270128 A1* | 9/2017 | Smith | A63F 13/80 |
| 2017/0354884 A1* | 12/2017 | Benedetto | A63F 13/493 |
| 2018/0280802 A1* | 10/2018 | Stroud | A63F 13/63 |
| 2019/0209925 A1* | 7/2019 | Benedetto | A63F 13/352 |
| 2019/0232168 A1* | 8/2019 | Benedetto | A63F 13/5375 |
| 2020/0160405 A1* | 5/2020 | Eatedali | G06Q 30/0277 |
| 2020/0306635 A1* | 10/2020 | Viswanathan | A63F 13/86 |
| 2021/0046388 A1* | 2/2021 | Schwarz | H04N 21/8549 |
| 2021/0187398 A1* | 6/2021 | Nair | A63F 13/5375 |
| 2022/0161143 A1* | 5/2022 | Nair | A63F 13/67 |

* cited by examiner

| Game ID | Level ID | Metric | Tutorial Video |
|---|---|---|---|
| Game_ID1 | Level_ID1 | Metric_ID1 | Video_ID1 |
| | | Metric_ID2 | Video_ID2 |
| | | Metric_ID3 | Video_ID3 |
| | Level_ID2 | Metric_ID1 | Video_ID4 |
| | | Metric_ID2 | Video_ID5 |
| | | Metric_ID3 | None |
| | Level_ID3 | Metric_ID1 | Video_ID6 |
| | | Metric_ID2 | Video_ID7 |
| | | Metric_ID3 | None |
| Game_ID2 | Level_ID1 | Metric_ID1 | Video_ID8 |
| Game_ID3 | Level_ID1 | Metric_ID1 | Video_ID9 |
| | | Metric_ID2 | Video_ID10 |
| | Level_ID2 | Metric_ID1 | Video_ID11 |
| | | Metric_ID2 | None |
| | Level_ID3 | Metric_ID1 | Video_ID12 |
| | | Metric_ID2 | Video_ID13 |

FIG. 5

GAMING CONTENT RECOMMENDATION BASED ON GAMING PERFORMANCE

CROSS-REFERENCE TO RELATED APPLICATION

This application is a continuation of U.S. patent application Ser. No. 16/718,885, filed Dec. 18, 2019, the disclosure of which is hereby incorporated by reference herein in its entirety.

BACKGROUND

The present disclosure relates to systems for content recommendation and, more particularly, to systems and related processes for recommending gaming content, such as video game performance videos or tutorials, based on gaming performance.

SUMMARY

A user playing a particular level of a video game may wish to improve a particular aspect of their performance of that game level. For instance, the user may wish to decrease a total amount of resources, such as time, ammunition, weapons, food, or the like, that they utilize throughout the course of their performance of the level. Or, the user may wish to increase a total amount of achievements, milestones, or other positive parameters, such as points, numbers of enemies defeated, health score, or the like, that attained throughout the course of their performance of the level. In an effort to help them achieve such gaming performance improvements, the user may wish to view one or more tutorial videos, such as a video of another player's performance of the game level of interest. The user, however, may not wish to cull through vast amounts of videos, user-uploaded or otherwise made available, that show other users playing the level to find a video that the user may find most helpful in achieving their goal for that level. It would thus be beneficial to have a system that can provide users with recommendations for videos or other content that are relevant and/or optimal in helping the user achieve their particular performance goal for a particular gaming level, sub-level, or combination thereof. Technical challenges involved in doing so, however, include how to identify video tutorials or other items of content that are relevant and helpful in achieving their particular goal(s).

In view of the foregoing, the present disclosure provides systems and related methods that recommend video game content based on video game performance. In one example, a streaming game server stores videos and indexes them by one or more parameters, such as corresponding game title, game level, and/or performance metric (for instance, time of level completion, resource utilization, or the like). The server then determines a gaming level that a user is playing or is expected to play next, selects an optimal tutorial video based on game, level, and/or performance metric, and displays within the video game a thumbnail or other option selectable to cause the displaying of the selected tutorial video. The server, in some aspects, may select the optimal tutorial video based on a metric that the user is struggling with—for instance as may be indicated based on uploaded video game data—or based on a metric selected by the user via a dropdown menu within the video game. The server may further optionally stitch together multiple video clips, such as video clips of performances of multiple sub-levels, to generate the optimal tutorial.

In another aspect, the present disclosure provides a system for recommending video game content based on video game performance. The system comprises a database and control circuitry. The database is configured to store a plurality of videos in association with corresponding video game performance metrics. The control circuitry is configured to identify a level from among a sequence of playable levels of a currently active video game. A video game performance metric for the identified level is determined. Based on the determined video game performance metric, a video of a performance of the identified level of the video game is selected for recommendation from among a plurality of videos stored in the database in association with corresponding video game performance metrics. An option, which is selectable to cause playback of the selected video, is transmitted for display via a computing device.

In another example, the determined video game performance metric comprises an amount of time taken to complete the level of the video game.

The determined video game performance metric, in some aspects, comprises at least one of an amount of resources within the video game consumed or remaining at completion of performance of the level of the video game.

In a further aspect, the determining of the video game performance metric comprises receiving a selection, entered via a user interface of the computing device, of the video game performance metric from among a plurality of video game performance metrics.

In another example, the option is transmitted for display via a leaderboard via the computing device.

The level, in some aspects, comprises a plurality of sub-levels. In such aspects, for example, the method further comprises selecting from the database, based on the video game performance metric, a plurality of video clips of performances of the sub-levels, respectively; and generating a combined video by combining the selected plurality of video clips. The generated combined video may be selected as the video for recommendation, and the option may be selectable to cause playback of the generated combined video. In a further aspect, the selecting of the plurality of video clips comprises, for each sub-level, selecting a video clip of a greatest performance, from among respective performances in the sub-level of the video game of a plurality of video clips stored in the database, as indicated by the video game performance metric.

In another example, the selecting the video for recommendation comprises selecting a video of a greatest performance in the identified level of the video game, from among respective performances in the identified level of the video game of a plurality of videos stored in the database, as indicated by the video game performance metric.

The method, in some aspects, further comprises determining a video game performance metric for a video of performance of the level of the video game. A determination is then made as to whether a value of the video game performance metric for the performance of the level of the video game exceeds a greatest value of the video game performance metric for which a video is stored in the database. In response to determining that the value of the video game performance metric for the performance of the level of the video game does not exceed the greatest value of the video game performance metric for which a video is stored in the database, the video of the performance of the level of the video game is deleted from the database.

In a further aspect, the method further includes determining a plurality of video game performance metrics for a video of performance of the level of the video game. The plurality of video game performance metrics are compared to the video game performance metrics stored in the database to determine whether one or more of the plurality of video game performance metrics represent greatest performances for the video game performance metrics. In response to determining that one or more of the plurality of video game performance metrics represent greatest performances for the video game performance metrics, the database is updated to include an indication that the video of performance of the level of the video game is associated with the one or more of the plurality of video game performance metrics determined to represent greatest performances for the video game performance metrics, for use in future content recommendations.

BRIEF DESCRIPTION OF THE DRAWINGS

The above and other objects and advantages of the disclosure will be apparent upon consideration of the following detailed description, taken in conjunction with the accompanying drawings, in which:

FIG. 5 shows an example data structure of a database of videos and corresponding video game performance metrics generated according to the process of FIG. 4, in accordance with some embodiments of the disclosure;

DETAILED DESCRIPTION

Figure 1:
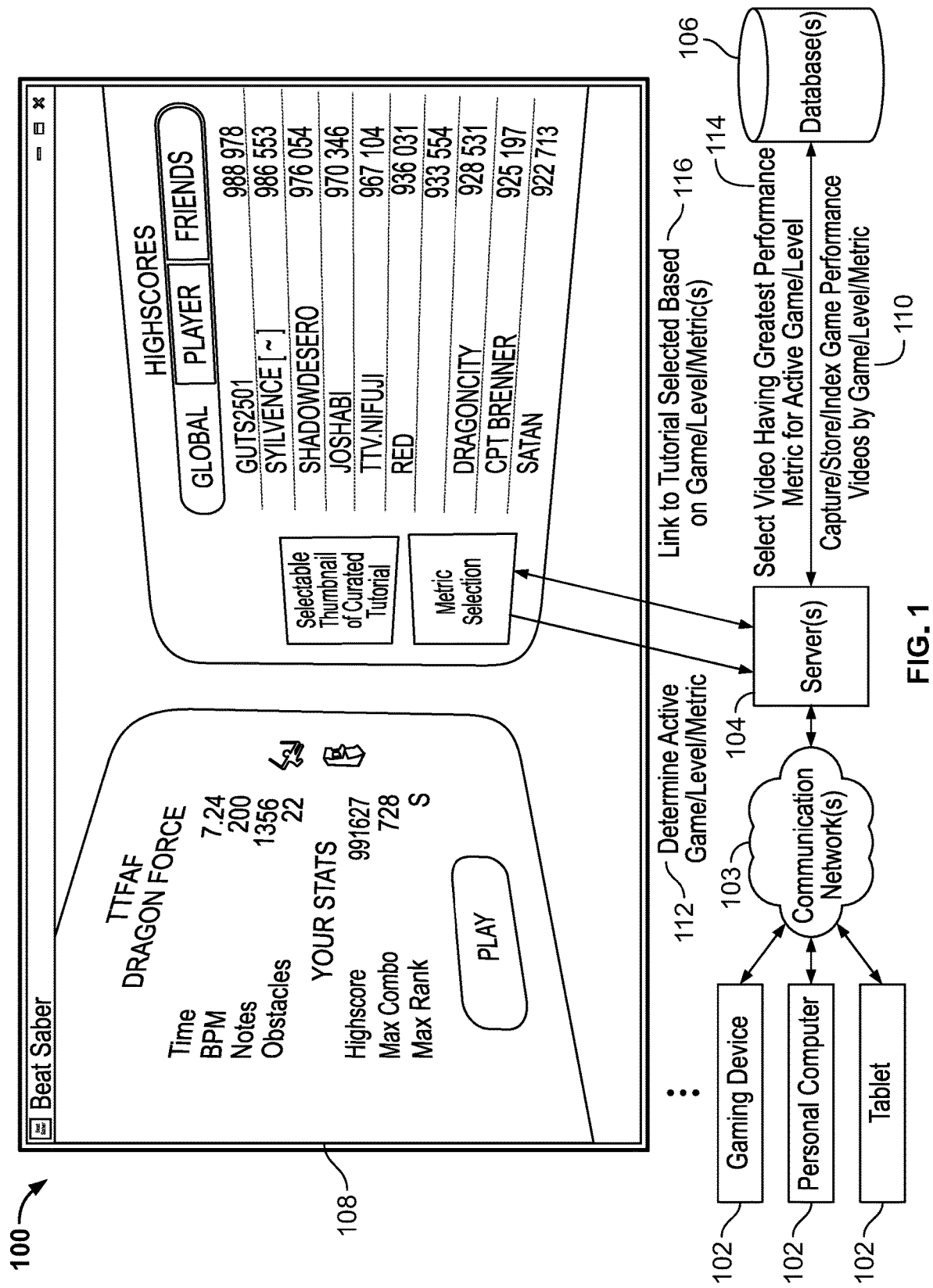
FIG. 1 shows an illustrative block diagram of a system for recommending content based on gaming progress, in accordance with some embodiments of the disclosure.
Figure 2:
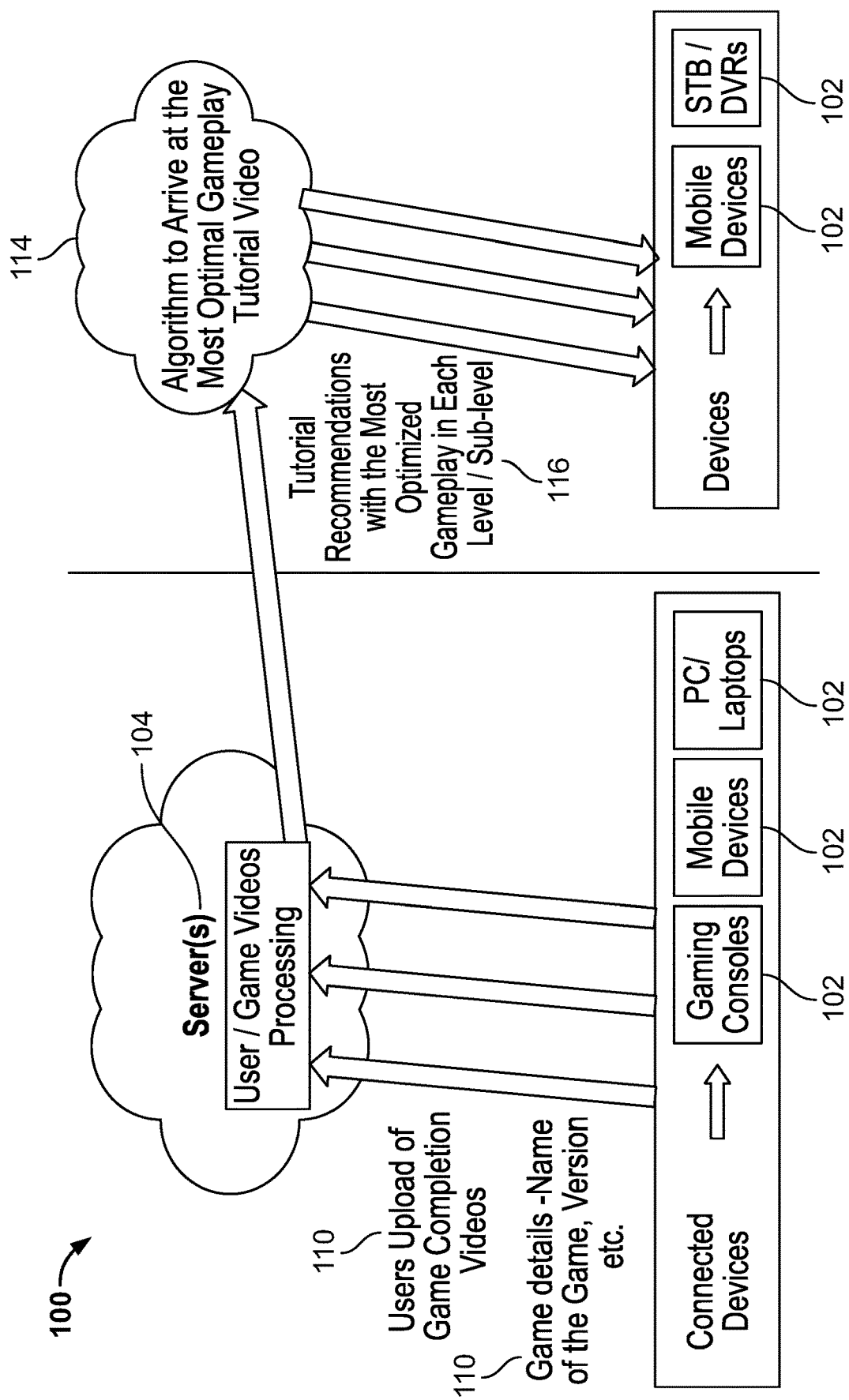
FIG. 2 is an illustrative block diagram showing additional details of a system for recommending content based on gaming progress, in accordance with some embodiments of the disclosure.

FIG. 1 and FIG. 2 are illustrative block diagrams that show various details of a system 100 for recommending content based on gaming progress, in accordance with some embodiments of the disclosure. System 100 includes one or more computing devices 102, servers 104, and tutorial databases 106. Example types of computing device 102 include, without limitation, a gaming device (such as a PLAYSTATION device, an XBOX device, or any other gaming device), a smartphone, a tablet, a personal computer, a set-top box (STB), a digital video recorder (DVR), and/or the like, that provides various user interfaces configured to interact with one or more nearby users. In some examples, computing device 102 provides a display 108, which is configured to display information via a graphical user interface. Computing device 102 is communicatively coupled to server 104 via one or more wireless and/or wired communication paths, such as network 103, and server 104 is communicatively coupled to tutorial database 106 via one or more other communication paths, such as a proprietary communication path and/or network 103. Network 103, in various aspects, may include the Internet or any other suitable network or group of networks.

In various embodiments, server 104 captures (110), from computing devices 102 over network 103, videos of game performances performed by one or more users using computing devices 102. For example, computing devices 102 may automatically push videos of game performances to server 104 over network 103, or server 104 may automatically pull videos of game performances from computing devices 102 over network 103. Alternatively or additionally, users may interact with user interfaces of computing devices 102 to cause videos of game performances to be uploaded to server 104 over network 103, along with game details or other relevant details, such as a name or other identifier of a game, a version of the game, an identifier of a game level of the video game performance, and/or the like. Computing device 102 stores (110) the captured videos of game performances in tutorial database 106 and indexes the videos according to game identifier, game level and/or game sub-level, game performance metric, and/or other types of criteria. Once database 106 has been populated with indexed video game tutorials, server 104 is configured to execute an algorithm, utilizing database 106, to select one or more game tutorial video recommendations to a user based on video games, levels, and/or game performance metrics of interest to the user.

Server 104, in some examples, may provide such a video game tutorial recommendation in response to determining that the user is playing a particular game and has selected a game performance metric of interest to the user for that game. In particular, server 104 may determine (112) a game identifier, a game level identifier, a game performance metric, and/or the like of a game that a user is playing via computing device 102 or plans to play via computing device 102. Server 104 may then access database 106 to search for and select (114), in a manner described in further detail below, a video of a game performance based on the game identifier, game level identifier, and/or game performance metric determined at 112. For example, server 104 may select (114) a game tutorial video that is relevant and/or optimal in helping the user achieve their particular performance goal for a particular gaming level, sub-level, or combination thereof, such as a video of a game performance that has a greatest value of the game performance metric determined at 112 across all the game performances stored in database 106 for the game and game level identifiers determined at 112.

Once server 104 has selected a tutorial video at 114, server 104 generates (116) for display via display 108 of computing device 102 a link to the selected tutorial, for instance together with a leaderboard. The displayed link is selectable by the user via a user interface of computing device 102 to cause playback via display 108 and/or one or more speakers (not shown in FIG. 1) of computing device 102 of the tutorial video. In this manner, system 100 can identify, and provide users with, recommendations for videos or other content that are relevant and/or optimal in helping the user achieve their particular performance goal for a particular gaming level, sub-level, or combination thereof. Additional details of the functionality of system 100 are provided below in the context of FIGS. 2 through 8.

Figure 3:
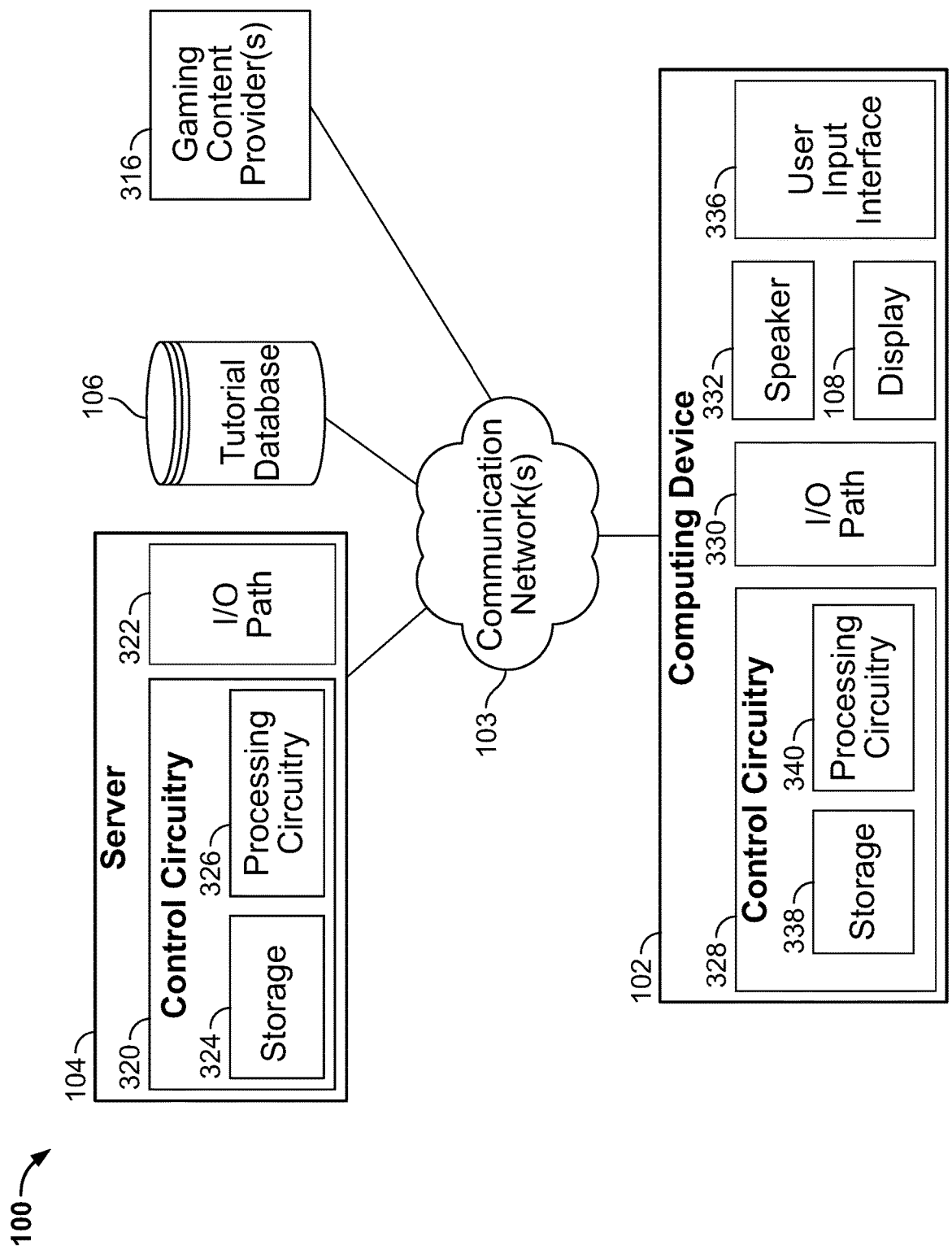
FIG. 3 is an illustrative block diagram showing further details of a system for recommending content based on gaming progress, in accordance with some embodiments of the disclosure.

FIG. 3 is an illustrative block diagram showing further details of system 100 for recommending content based on gaming progress, in accordance with some embodiments of the disclosure. Although FIG. 3 shows system 100 as including a number and configuration of individual components, in some embodiments, any number of the components of system 100 may be combined and/or integrated as one device. System 100 includes computing device 102, server 104, tutorial database 106, and gaming content provider(s) 316, each of which is communicatively coupled to communication network 103, which may include the Internet or any other suitable network or group of networks. For instance, in some embodiments, server 104 works in conjunction with computing device 102 to implement certain functionality described herein in a distributed or cooperative manner. The one or more gaming content provider(s) 316, in some examples, are configured to provide server 104 with information regarding games, such as game identifiers, game level identifiers, game sub-level identifiers, game performance metrics for games, levels, and/or sub-levels, and/or other types of information that server 104 may utilize for various purposes, such as to construct data structure 500 of database 106, as described in further detail below.

Server 104 includes control circuitry 320 and input/output (hereinafter "I/O") path 322, and control circuitry 320 includes storage 324 and processing circuitry 326. Computing device 102, which, as described above in connection with FIG. 1, may be a personal computer, a laptop computer, a tablet computer, a smartphone, a smart television, a smart speaker, or any other type of computing device, includes control circuitry 328, I/O path 330, speaker 332, display 108, and user input interface 336. Control circuitry 328 includes storage 338 and processing circuitry 340. Control circuitry 320 and/or 328 may be based on any suitable processing circuitry such as processing circuitry 326 and/or 340. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors, for example, multiple of the same type of processors (e.g., two Intel Core i9 processors) or multiple different processors (e.g., an Intel Core i7 processor and an Intel Core i9 processor).

Each of storage 324, storage 338, and/or storages of other components of system 100 (e.g., storages of tutorial database 106, and/or the like) may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 324, storage 338, and/or storages of other components of system 100 may be used to store various types of content, metadata, and or other types of data. Non-volatile memory may also be used (e.g.,
to launch a boot-up routine and other instructions). Cloud-based storage may be used to supplement storages 324, 338 or instead of storages 324, 338. In some embodiments, control circuitry 320 and/or 328 executes instructions for an application stored in memory (e.g., storage 324 and/or 338). Specifically, control circuitry 320 and/or 328 may be instructed by the application to perform the functions discussed herein. In some implementations, any action performed by control circuitry 320 and/or 328 may be based on instructions received from the application. For example, the application may be implemented as software or a set of executable instructions that may be stored in storage 324 and/or 338 and executed by control circuitry 320 and/or 328. In some embodiments, the application may be a client/server application where only a client application resides on computing device 102, and a server application resides on server 104.

The application may be implemented using any suitable architecture. For example, it may be a stand-alone application wholly implemented on computing device 102. In such an approach, instructions for the application are stored locally (e.g., in storage 338), and data for use by the application is downloaded on a periodic basis (e.g., from an out-of-band feed, from an Internet resource, or using another suitable approach). Control circuitry 328 may retrieve instructions for the application from storage 338 and process the instructions to perform the functionality described herein. Based on the processed instructions, control circuitry 328 may determine what action to perform when input is received from user input interface 336.

In client/server-based embodiments, control circuitry 328 may include communication circuitry suitable for communicating with an application server (e.g., server 104) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 103). In another example of a client/server-based application, control circuitry 328 runs a web browser that interprets web pages provided by a remote server (e.g., server 104). For example, the remote server may store the instructions for the application in a storage device. The remote server may process the stored instructions using circuitry (e.g., control circuitry 320) and/or generate displays. Computing device 102 may receive the displays generated by the remote server and may display the content of the displays locally via display 108. This way, the processing of the instructions is performed remotely (e.g., by server 104) while the resulting displays, such as the display windows described elsewhere herein, are provided locally on computing device 102. Computing device 102 may receive inputs from the user via input interface 336 and transmit those inputs to the remote server for processing and generating the corresponding displays.

A user may send instructions to control circuitry 320 and/or 328 using user input interface 336. User input interface 336 may be any suitable user interface, such as a gaming controller, touchscreen, trackball, keypad, keyboard, touchpad, stylus input, joystick, voice recognition interface, remote control, or other user input interfaces. User input interface 336 may be integrated with or combined with display 108, which may be a monitor, a television, a liquid crystal display (LCD), an electronic ink display, or any other equipment suitable for displaying visual images.

Server 104 and computing device 102 may transmit and receive content and data via I/O path 322 and 330, respectively. For instance, I/O path 322 and/or I/O path 330 may include a communication port configured to transmit and/or receive (for instance to and/or from content database 106), via communication network 103, content item identifiers, natural language queries, and/or other data. Control circuitry 320, 328 may be used to send and receive commands, requests, and other suitable data using I/O paths 322, 330.

Figure 4:
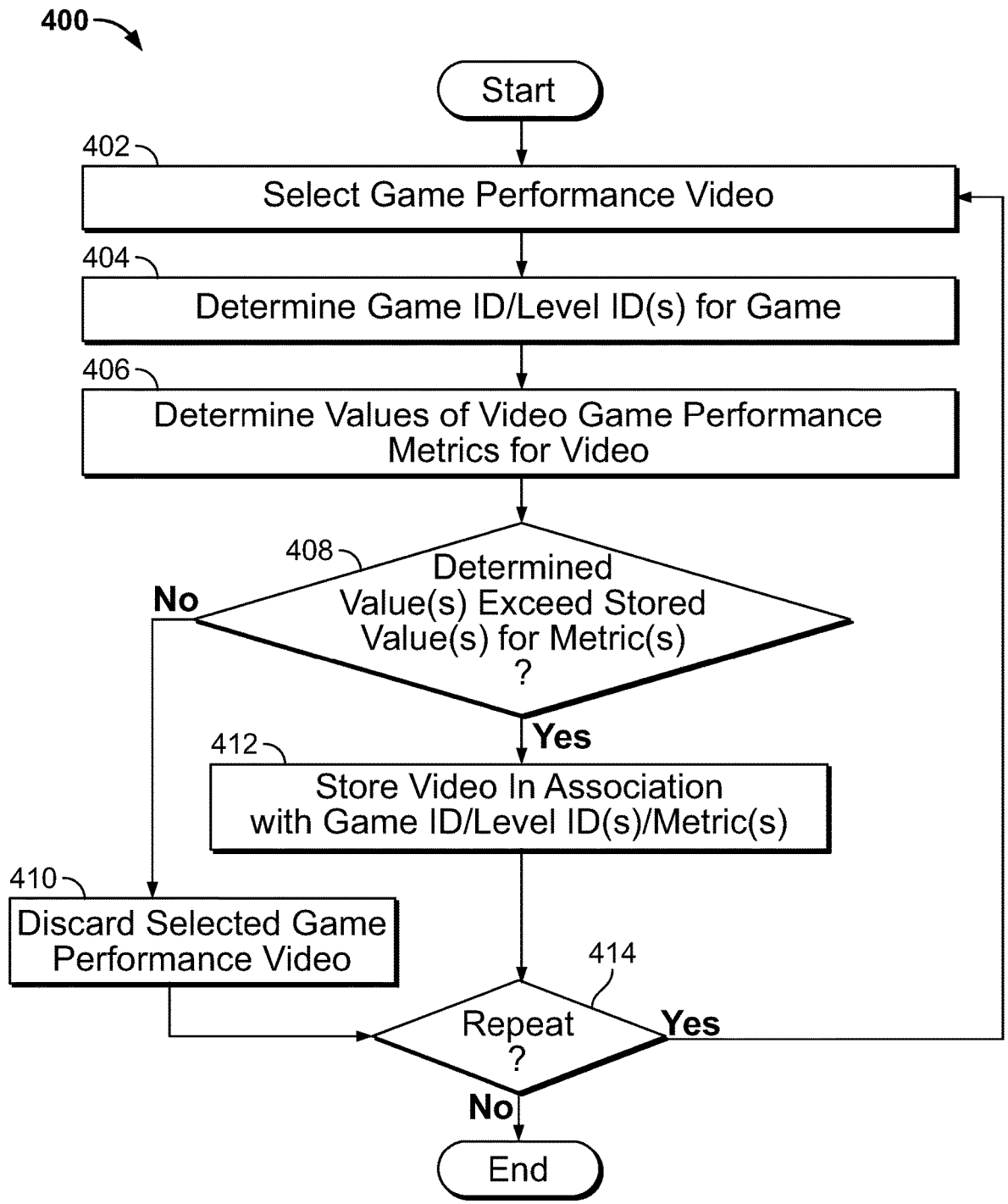
FIG. 4 is an illustrative flowchart of a process for generating a database of videos and corresponding video game performance metrics, in accordance with some embodiments of the disclosure.

Having described system 100, reference is now made to FIG. 4, which depicts an illustrative flowchart of process 400 for generating a database of videos and corresponding video game performance metrics, which may be implemented by system 100 in accordance with some embodiments of the disclosure. In various embodiments, individual steps of process 400, or any process described herein, may be implemented by one or more components of system 100. Although the present disclosure may describe certain steps of process 400 (and of other processes described herein) as being implemented by certain components of system 100, this is for purposes of illustration only, and other components of system 100 may implement those steps instead. At 402, control circuitry 320 selects a game performance video. The game performance video, for instance, may be selected in response to a user uploading the game performance video to server 104 via computing device 102 over network 103. In another example, the game performance video may be automatically selected in accordance with a configured automatic pushing or pulling of game performance videos from computing device 102 to server 104 over network 103.

At 404, control circuitry 320 determines a game identifier that uniquely identifies the game that was played in the game performance video that was selected at 402. In some examples, control circuitry 320 determines the game identifier by reading a game identifier field that is communicated by computing device 102 to server 104 over network 103 along with the communication of the video game performance. At 404 control circuitry 320 may also determine a level or sub-level identifier that uniquely identifies the level and/or sub-level of the game that was played in the game performance video that was selected at 402. In some examples, control circuitry 320 determines the game level and/or sub-level identifier by reading a game level and/or sub-level identifier field that is communicated by computing device 102 to server 104 over network 103 along with the communication of the video game performance.

At 406, control circuitry 320 determines one or more values of video game performance metrics achieved in the playing of the video game depicted in the game performance video. Example types of video game performance metrics include, without limitation, an amount of resources, such as time, ammunition, weapons, food, or the like, utilized throughout the course of performance of a game level or sub-level; and an amount of achievements, milestones, or other positive parameters, such as points, numbers of enemies defeated, health score, or the like, attained throughout the course of performance of a game level or sub-level. Each level and/or sub-level of each game may have its own corresponding set of game performance metrics, and database 106 may include a data structure (such as data structure 500 described below) that indicates the sets of game performance metrics for each game level and sub-level.

At 408, control circuitry 320 determines whether each value of each video game performance metric determined at 406 exceeds a maximum value among values of that game performance metric stored in database 106 for that particular game identifier and level or sub-level identifier. If control circuitry 320 determines that the value of a particular video game performance metric does not exceed a maximum value among values of that metric stored in database 106 for that game and level or sub-level ("NO" at 408), then at 410, control circuitry 320 discards the video game performance video that was selected at 402. If, on the other hand, control circuitry 320 determines that the value of a particular video game performance metric determined at 406 exceeds a maximum value among values of that metric stored in database 106 for that game and level or sub-level ("YES" at 408), then at 412, control circuitry 320 stores the game performance video selected at 402 in database 106 in association with that particular video game performance metric and the game identifier and level or sub-level identifier determined at 404. In this manner, database 106 may store only videos of game performances that exhibit a maximum game performance metric value, thereby resulting in efficient storage utilization.

After 410 or 412, control passes to 414, at which control circuitry 320 determines whether to repeat the process of 402 through 412 for another game performance video. For example, control circuitry 320 may determine whether to repeat the process by determining whether server 104 has received from computing device 102 over network 103 another game performance video that requires processing to determine whether it should be stored in database 106. If control circuitry 320 determines to repeat the process of 402 through 412 for another game performance video ("YES" at 414), then control passes back to 402 to repeat the process described above for another game performance video. If, on the other hand, control circuitry 320 determines not to repeat the process of 402 through 412 for another game performance video ("NO" at 414), then process 400 terminates.

FIG. 5 shows an example data structure 500 for tutorial database 106 of videos and corresponding video game performance metrics that may be generated according to process 400 of FIG. 4, and utilized for generating video tutorial recommendations in accordance with process 600, in accordance with some embodiments of the disclosure. In particular, data structure 500 includes a variety of data field entries 510, 512, 514, which may be generated and stored in database 106 in the manner described above for process 400, and which associate tutorial videos 508 with corresponding game identifiers 502, level and/or sub-level identifiers 504, and game performance metrics 506. In the example of FIG. 5, data structure 500 identifies for each game performance metric 506 an optimal tutorial video 508, if any, that is stored in database 106 for a particular level/sub-level 504 of a particular game identified by game identifier 510. A tutorial video, in some examples, is deemed optimal for a particular game performance metric of a level or sub-level of a game when the value of that game performance metric achieved in that tutorial video is a maximum value (or minimum value, depending on whether the metric is a positive metric where the greater the value the better the performance or a negative metric where the lower the value the greater the performance) from among all values of that particular game performance metric of the level or sub-level of the game that have been received and processed by server 104. In some embodiments, storing only the optimal tutorial videos for each combination of game identifier 502, game level/sub-level 504, and performance metric 506 results in efficient storage utilization. In other embodiments, although not shown in FIG. 5, rather than storing only optimal tutorial videos 508, data structure 500 includes multiple tutorial videos 508 for an individual game performance metric 506 of an individual levels/sub-level 504 of a game identifier 502. In such embodiments, each game performance metric 506 includes an identifier of a particular type of game performance metric along with a numerical value of that performance metric achieved in the corresponding tutorial video 508.

Figure 6:
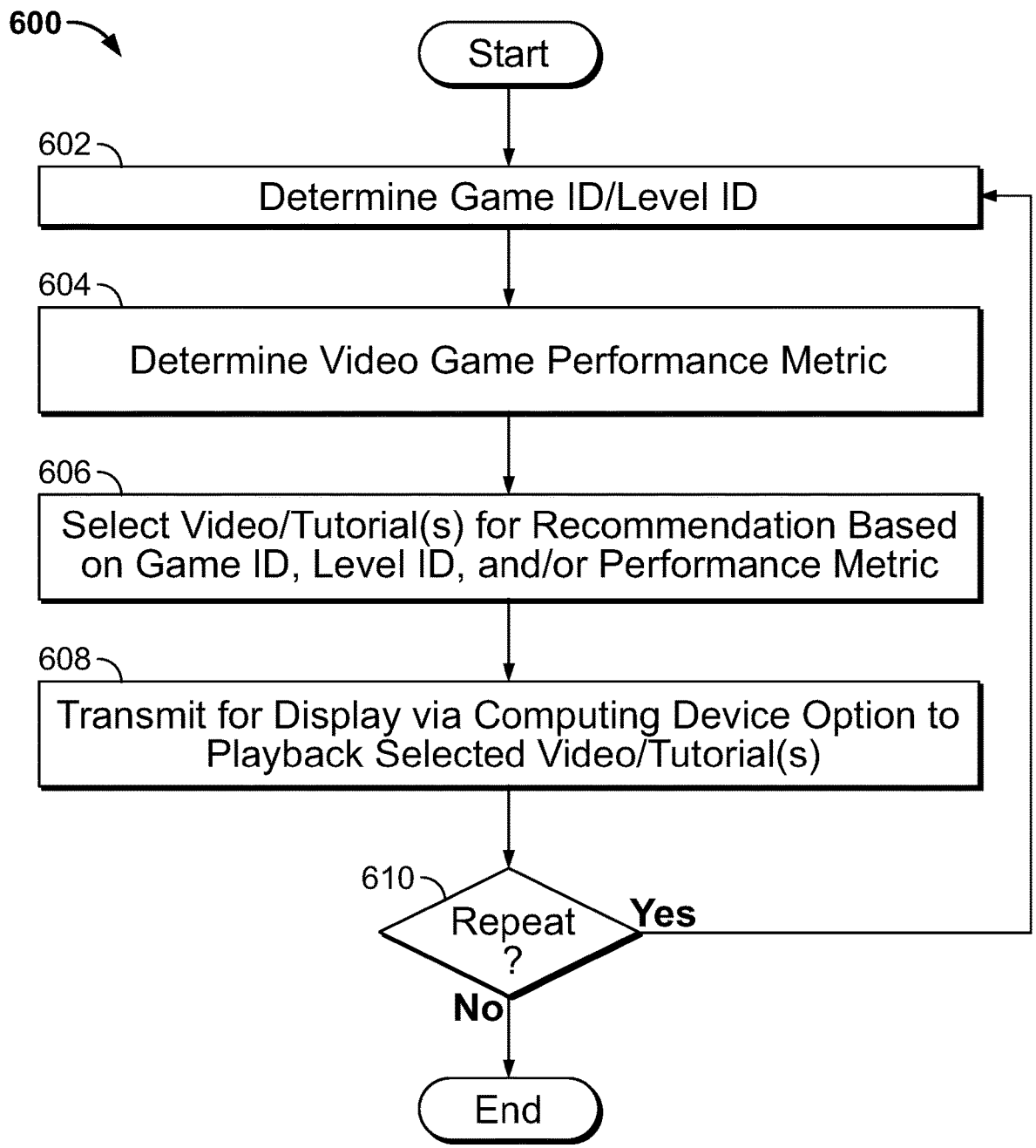
FIG. 6 is an illustrative flowchart of a process for recommending content based on gaming progress, in accordance with some embodiments of the disclosure.

FIG. 6 is an illustrative flowchart of process 600 for recommending content, such as video game performance videos or tutorials based on a user's gaming progress, in accordance with some embodiments of the disclosure. At 602, control circuitry 320 determines a game identifier of a video game that a user is actively playing, or has selected to play shortly, via computing device 102. For example, control circuitry 320 may determine the game identifier based on a game identifier data field that is automatically, or in response to a user command inputted by the user into computing device 102, communicated from computing device 102 to server 104 via network 103. Control circuitry 320 also determines, from among a sequence of playable levels of the game identified at 602, a game level identifier and/or game sub-level identifier of the level and/or sub-level of the game being played or otherwise of interest to the user. Control circuitry 320 may determine the game level identifier and/or game sub-level identifier based on game level identifier and/or game sub-level identifier data fields that may be automatically, or in response to a user command inputted by the user into computing device 102, communicated from computing device 102 to server 104 via network 103.

At 604, control circuitry 320 determines a game performance metric of interest to the user. For example, in some embodiments, computing device 102 displays a dropdown menu (or other input field), such as the metric selection field shown in display 108 of FIG. 1, by which the user can select a game performance metric of interest. In such embodiments, computing device 102 may communicate the selected game performance metric to server 104 over network 103.

At 606, control circuitry 320 selects for recommendation, based on the determined video game performance metric, a video (e.g., a tutorial video) of a performance of the identified level and/or sub-level of the video game from among the videos stored in database 106. At 608, control circuitry 320 transmits for display via computing device 102 an option, such as the thumbnail shown in display 108 of FIG. 1, that is selectable to cause computing device 102 to playback the video selected at 606 for recommendation. Additional details of how control circuitry 320 may select a video for recommendation at 606 are provided below in connection with FIG. 7.

At 610, control circuitry 320 determines whether to repeat the process of 602 through 608 to provide another video tutorial recommendation. For example, control circuitry 320 may determine whether to repeat the process of 602 through 608 based on a determination of whether the user has selected a different game performance metric via the metric selection field shown in display 108 of FIG. 1. As another example, the user may interact with computing device 102 to request another video recommendation. As still another example, control circuitry 320 may be configured to automatically generate multiple video recommendations to provide the user with more video tutorial options. If control circuitry 320 determines to repeat the process of 602 through 608 ("YES" at 610), then control passes back to 602 to repeat the process described above to generate another video tutorial recommendation. If, on the other hand, control circuitry 320 determines not to repeat the process of 602 through 608 ("NO" at 610), then process 600 terminates.

Figure 7:
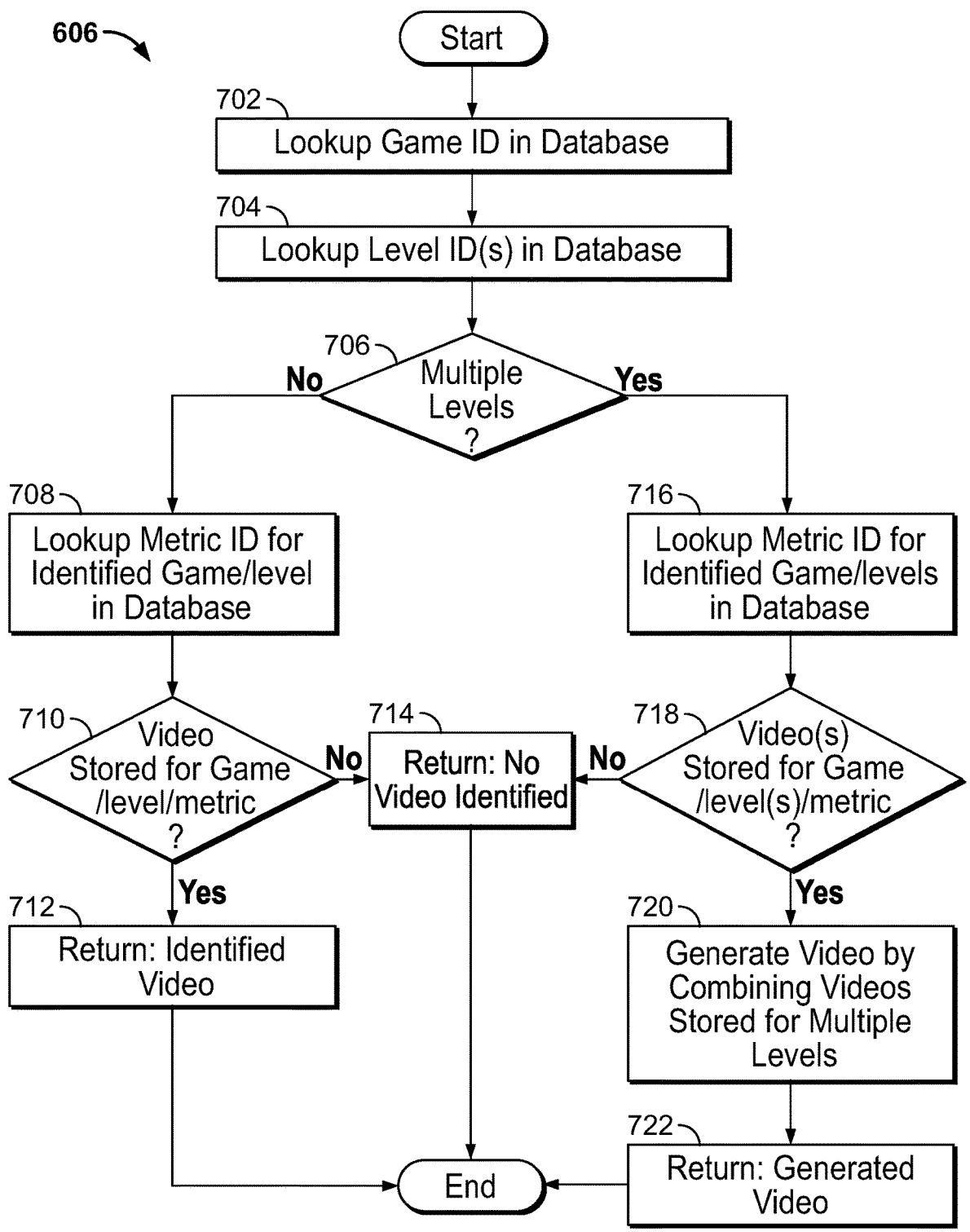
FIG. 7 is an illustrative flowchart of a process for selecting a video for recommendation based on a game identifier, a level identifier, and/or a performance metric, in accordance with some embodiments of the disclosure.

FIG. 7 is an illustrative flowchart of process 606 for selecting a video for recommendation based on a game identifier, a level identifier, and/or a performance metric, in accordance with some embodiments of the disclosure. At 702, control circuitry 320 performs a lookup in database 106 for the game identifier determined at 602. At 704, control circuitry 320 performs a lookup in database 106 for the game level identifier and/or game sub-level identifier determined at 602.

At 706, control circuitry 320 determines whether the game level identified at 704 includes multiple sub-levels. For example, database 106 may include a data structure (e.g., data structure 500) that control circuitry 320 can look to for an indication of whether the game level identified at 704 includes multiple game sub-levels. In another example, control circuitry 320 may determine whether the game level identified at 704 includes multiple game sub-levels based on a determination that multiple sub-levels were identified at 704. If control circuitry 320 determines that the level identified at 704 includes multiple sub-levels ("YES" at 706), then control passes to 716. If, on the other hand, control circuitry 320 determines that the level identified at 704 does not include any sub-levels ("NO" at 706), then control passes to 708.

At 708, control circuitry 320 searches database 106 for the game performance metric identifier that was determined at 604 for the game and game level that were identified at 602. At 710, control circuitry 320 determines whether database 106 includes a game performance video stored for the game, game level, and game performance metric identified at 602 and 604. If control circuitry 320 determines that database 106 includes a game performance video stored for the game, game level, and game performance metric identified at 602 and 604 ("YES" at 710), then at 712 control circuitry 320 returns the game performance video identified at 710, after which process 606 terminates. If, on the other hand, control circuitry 320 determines that database 106 does not include any game performance video stored for the game, game level, and game performance metric identified at 602 and 604 ("NO" at 710), then at 714 control circuitry 320 returns an indication that no game performance video has been identified for that combination of game, game level, and game performance metric, after which process 606 terminates.

At 716, control circuitry 320 searches database 106 for the game performance metric identifier that was determined at 604 for the game and game sub-levels identified at 602. At 718, control circuitry 320 determines whether database 106 includes game performance videos stored for the game, game sub-levels, and game performance metric identified at 602 and 604. If control circuitry 320 determines that database 106 includes game performance videos stored for the game, game sub-levels, and game performance metric identified at 602 and 604 ("YES" at 718), then at 720 control circuitry 320 generates a stitched game performance video by combining or stitching together the videos stored for the multiple levels determined at 718, as illustrated in further detail in FIG. 8. Then at 722, control circuitry 320 returns the stitched game performance video generated at 720, after which process 606 terminates. If, on the other hand, control circuitry 320 determines that database 106 does not include any videos stored for the game, game sub-levels, and game performance metric identified at 602 and 604 ("NO" at 718), then at 714 control circuitry 320 returns an indication that no game performance videos have been identified for that combination of game, game sub-levels, and game performance metric, after which process 606 terminates.

Figure 8:
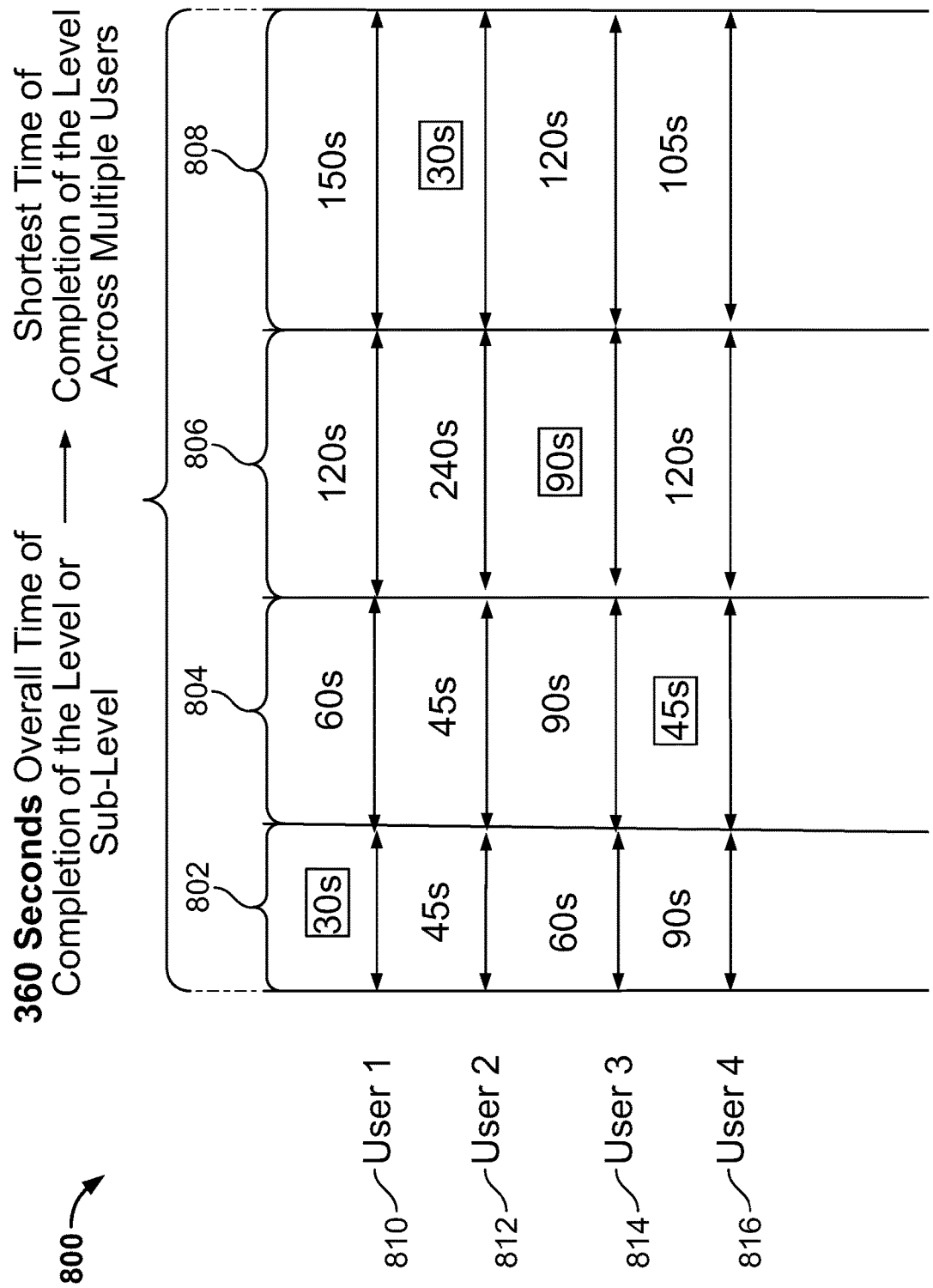
FIG. 8 illustrates a scenario in which a combined video is generated for recommendation by combining multiple selected video clips, in accordance with some embodiments of the disclosure.

FIG. 8 illustrates a scenario 800 in which a combined video may be generated (as described above in connection with 720 of process 700) for recommendation by combining multiple selected video clips, in accordance with some embodiments of the disclosure. Such a scenario may arise in some embodiments, where a particular game level that is of interest to a user may include multiple game sub-levels, thereby complicating the process of providing an optimal game performance video recommendation for the user given that user's particular goal for that game level. For instance, the user may wish to view a game performance video that shows the user the fastest time of completion of a game level of interest, with the game level comprising four game sub-levels 802, 804, 806, and 808. As shown in FIG. 8, database 106 may include multiple videos of game performances for users 810, 812, 814, and 816 of the game level of interest. Each of users 810, 812, 814, 816 may have completed the level in 360 seconds. In such an example, if control circuitry 320 recommends any one of videos 810, 812, 814, or 816 to the user, the user will be shown how to complete the level in 360 seconds. Such a recommendation can be optimized, however, by selecting and stitching together the individual video clips of the optimal (fastest, in this example) performances of game sub-levels 802, 804, 806, 808 across users 810, 812, 814, and 816, in the manner described above in connection with process 700. In this manner, control circuitry 320 can present the user with a stitched video that shows the user how to complete the level in 195 seconds (the sum of the 30 second, 45 second, 90 second, and 30 second optimal performances of the game sub-levels 802, 804, 806, and 808).

The systems and processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for recommending video game content, the method comprising:
identifying a level from among a plurality of playable levels of a video game accessed by a profile;
determining a video game performance metric for the identified level;
selecting, based on the determined video game performance metric, a plurality of video clips of a performance of the identified level of the video game from among a plurality of videos stored in a database in association with corresponding video game performance metrics;
generating a combined video by combining the selected plurality of video clips, wherein the combined video is selected as the video for recommendation, and wherein an option is selectable to cause playback of the combined video;
transmitting, for display via a computing device, the option that is selectable to cause playback of the combined video,
determining a plurality of video game performance metrics for a video of performance of the level of the video game;
determining whether one or more of the plurality of video game performance metrics represent greatest performances for the video game performance metrics by comparing the plurality of video game performance metrics to the video game performance metrics stored in the database; and
adding, to the database, an indication that the video of performance of the level of the video game is associated with the one or more of the plurality of video game performance metrics determined to represent greatest performances for the video game performance metrics, in response to determining that one or more of the plurality of video game performance metrics represent greatest performances for the video game performance metrics.

2. The method of claim 1, wherein the determined video game performance metric comprises an amount of time taken to complete the level of the video game.

3. The method of claim 1, wherein the determined video game performance metric comprises at least one of an amount of resources within the video game consumed or remaining at completion of performance of the level of the video game.

4. The method of claim 1, wherein the determining of the video game performance metric comprises receiving a selection, entered via a user interface of the computing device, of the video game performance metric from among a plurality of video game performance metrics.

5. The method of claim 1, wherein the option is transmitted for display via a leaderboard via the computing device.

6. The method of claim 1, further comprising:
determining a first video game performance metric for a first video stored in the database;
determining whether a value of the first video game performance metric exceeds a greatest value of the video game performance metric for which a video is stored in the database; and
in response to determining that the value of the first video game performance metric does not exceed the greatest value of the video game performance metric for which a video is stored in the database, deleting from the database the first video.

7. A system for recommending video game content based on video game performance, the system comprising:
a database configured to store a plurality of videos in association with corresponding video game performance metrics; and
control circuitry configured to:
identify a level from among a plurality of playable levels of a video game accessed by a profile;
determine a video game performance metric for the identified level;
select, based on the determined video game performance metric, a plurality of video clips of a performance of the identified level of the video game from among the plurality of videos stored in the database;
generate a combined video by combining the selected plurality of video clips, wherein the combined video is selected as the video for recommendation, and wherein an option is selectable to cause playback of the combined video;

transmit, for display via a computing device, the option that is selectable to cause playback of the combined video;

determine a plurality of video game performance metrics for a video of performance of the level of the video game;

determine whether one or more of the plurality of video game performance metrics represent greatest performances for the video game performance metrics by comparing the plurality of video game performance metrics to the video game performance metrics stored in the database; and add, to the database, an indication that the video of performance of the level of the video game is associated with the one or more of the plurality of video game performance metrics determined to represent greatest performances for the video game performance metrics, in response to determining that one or more of the plurality of video game performance metrics represent greatest performances for the video game performance metrics.

8. The system of claim 7, wherein the determined video game performance metric comprises an amount of time taken to complete the level of the video game.

9. The system of claim 7, wherein the determined video game performance metric comprises at least one of an amount of resources within the video game consumed or remaining at completion of performance of the level of the video game.

10. The system of claim 7, wherein the control circuitry is further configured to receive a selection, entered via a user interface of the computing device, of the video game performance metric from among a plurality of video game performance metrics.

11. The system of claim 7, wherein the option is transmitted for display via a leaderboard via the computing device.

12. The system of claim 7, wherein the control circuitry is further configured to:
 determine a first video game performance metric for a first video stored in the database;
 determine whether a value of the first video game performance exceeds a greatest value of the video game performance metric for which a video is stored in the database; and
 in response to determining that the value of the first video game performance metric does not exceed the greatest value of the video game performance metric for which a video is stored in the database, delete from the database the first video.

13. A non-transitory computer-readable medium having instructions encoded thereon that, when executed by control circuitry, cause the control circuitry to:
 identify a level from among a plurality of playable levels of a video game accessed by a profile;
 determine a video game performance metric for the identified level;
 select, based on the determined video game performance metric, a plurality of video clips of a performance of the identified level of the video game from among a plurality of videos stored in a database; in association with corresponding video game performance metrics;
 generate a combined video by combining the selected plurality of video clips, wherein the combined video is selected as the video for recommendation, and wherein an option is selectable to cause playback of the combined video;
 transmit, for display via a computing device, the option that is selectable to cause playback of the combined video;
 determine a plurality of video game performance metrics for a video of performance of the level of the video game;
 determine whether one or more of the plurality of video game performance metrics represent greatest performances for the video game performance metrics by comparing the plurality of video game performance metrics to the video game performance metrics stored in the database; and
 add, to the database, an indication that the video of performance of the level of the video game is associated with the one or more of the plurality of video game performance metrics determined to represent greatest performances for the video game performance metrics, in response to determining that one or more of the plurality of video game performance metrics represent greatest performances for the video game performance metrics.

14. The non-transitory computer-readable medium of claim 13, wherein the determined video game performance metric comprises an amount of time taken to complete the level of the video game.

15. The non-transitory computer-readable medium of claim 13, wherein the determined video game performance metric comprises at least one of an amount of resources within the video game consumed or remaining at completion of performance of the level of the video game.

16. The non-transitory computer-readable medium of claim 13, wherein the control circuitry is further configured to receive a selection, entered via a user interface of the computing device, of the video game performance metric from among a plurality of video game performance metrics.

17. The non-transitory computer-readable medium of claim 13, wherein the option is transmitted for display via a leaderboard via the computing device.

18. The non-transitory computer-readable medium of claim 13, wherein the control circuitry is further configured to:
 determine a first video game performance metric for a first video stored in the database;
 determine whether a value of the first video game performance metric exceeds a greatest value of the video game performance metric for which a video is stored in the database; and
 in response to determining that the value of the first video game performance metric does not exceed the greatest value of the video game performance metric for which a video is stored in the database, delete from the database the first video.

* * * * *